(12) United States Patent
Hilsebecher et al.

(10) Patent No.: US 8,542,106 B2
(45) Date of Patent: Sep. 24, 2013

(54) METHOD AND DEVICE FOR IDENTIFYING AND CLASSIFYING OBJECTS

(75) Inventors: Joerg Hilsebecher, Hildesheim (DE); Martin Randler, Immenstaad (DE); Paco Haffmans, Boeblingen (DE); Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 11/919,622

(22) PCT Filed: Apr. 26, 2006

(86) PCT No.: PCT/EP2006/061929
§ 371 (c)(1),
(2), (4) Date: Nov. 10, 2009

(87) PCT Pub. No.: WO2006/128766
PCT Pub. Date: Dec. 7, 2006

(65) Prior Publication Data
US 2010/0097200 A1  Apr. 22, 2010

(30) Foreign Application Priority Data
May 30, 2005  (DE) .......................... 10 2005 024 716

(51) Int. Cl.
*B60Q 1/00*  (2006.01)
*B60R 22/00*  (2006.01)
*G06K 9/00*  (2006.01)
*G01S 13/00*  (2006.01)
*G06T 15/40*  (2011.01)

(52) U.S. Cl.
USPC .............................. 340/435; 340/436; 701/45

(58) Field of Classification Search
USPC ..................... 340/435, 436; 701/45
See application file for complete search history.

(56) References Cited

U.S. PATENT DOCUMENTS

| | | | |
|---|---|---|---|
| 6,518,916 B1 * | 2/2003 | Ashihara et al. | 342/70 |
| 2004/0019426 A1 | 1/2004 | Knoop et al. | |
| 2005/0270286 A1 * | 12/2005 | Hirvonen et al. | 345/422 |
| 2006/0115113 A1 * | 6/2006 | Lages et al. | 382/103 |
| 2011/0137527 A1 * | 6/2011 | Simon et al. | 701/45 |

FOREIGN PATENT DOCUMENTS

| | | |
|---|---|---|
| DE | 102 56 671 | 6/2003 |
| EP | 1 094 336 | 4/2001 |
| EP | 1 462 823 | 9/2004 |
| EP | 1 557 694 | 7/2005 |
| JP | 5-83344 | 11/1993 |
| JP | 11-271441 | 10/1999 |
| JP | 2001-116833 | 4/2001 |
| JP | 2003-167054 | 6/2003 |
| JP | 2004-125636 | 4/2004 |
| JP | 2004-521027 | 7/2004 |
| JP | 2004-260527 | 9/2004 |
| JP | 2005-87359 | 4/2005 |
| WO | WO 03/006289 | 1/2003 |

* cited by examiner

Primary Examiner — George Bugg
Assistant Examiner — Jack K Wang
(74) Attorney, Agent, or Firm — Kenyon & Kenyon LLP (57) ABSTRACT

A method and device for identifying and classifying objects, electromagnetic radiation being emitted by a sensor, the radiation components reflected on objects being received by the sensor, the received signals being analyzed by comparison with stored characteristic values and the class of the reflecting object being deduced on the basis of the analysis. To this end, an analyzer is provided for analyzing the received signals, a memory is provided for storing characteristic patterns, its stored patterns being compared with the analyzed signals and thus the class of the reflecting objects being deducible on the basis of the comparison.

22 Claims, 8 Drawing Sheets

METHOD AND DEVICE FOR IDENTIFYING AND CLASSIFYING OBJECTS

FIELD OF THE INVENTION

The present invention relates to a method and a device for identifying and classifying objects, electromagnetic radiation being emitted by a sensor, the radiation components reflected on objects being received by the sensor, the received signals being analyzed by comparison with stored characteristic patterns, and the class of the reflecting object being deduced on the basis of the analysis. To do so, an analyzer is provided for analyzing the received signals, a memory is provided for storing characteristic patterns, its stored patterns being compared with the analyzed signals and thus the class of the reflecting objects being deducible on the basis of this comparison.

BACKGROUND INFORMATION

German Patent Application No. DE 102 31 558 A1 describes a method and a device for automatically triggering deceleration of a vehicle to prevent a collision with another object or prevent the consequences of an imminent collision with another object. Objects in the immediate path of the vehicle are detected by signals of a device for transmitting and receiving radar signals or lidar signals or a device for receiving video signals. Depending on the identified objects, a potential hazard is determined, and the deceleration device is actuated in at least three states as a function of the hazard potential, at least one of these states causing the deceleration device of the vehicle to be in a preparatory state for braking.

SUMMARY

An object of the present invention is to provide a method and a device by which sensor signals that are reflected by transmitting electromagnetic radiation and reflection of this transmitted radiation on objects within the object detection range are received again by the sensor and analyzed with regard to predetermined characteristic patterns in order to be able to deduce the type of object by comparison with stored characteristic patterns and assign the detected object to an object class.

In accordance with an embodiment of the present invention, the analysis of the received signals is advantageously performed in the frequency range by transforming the received signals by a Fourier transform and comparing them with characteristic frequency patterns. Due to the transformation in the frequency range, which is implementable by a Fourier transform or a discrete Fourier transform, the individual reflected signals may be analyzed spectrally in the frequency range, thus allowing a comparison with characteristic frequency patterns.

It is also advantageous that the analysis is performed in the orthogonal space by determining the relative positions of the object reflections in relation to the host vehicle and comparing them with characteristic spatial patterns. An analysis as a function of directions in space is provided as the orthogonal space, so that a coordinate system that may be defined with respect to the sensor device is advantageously provided. The axes in space may be oriented in such a way that they are parallel to the longitudinal axis of the vehicle, the vertical axis of the vehicle, and the transverse axis of the vehicle. The spatial analysis of the received signals is performed by converting the distances and azimuth angles of the reflection points with regard to the sensor into Cartesian coordinates and thus the reflection points are in the orthogonal space of the Cartesian coordinate system of the sensor. Due to the spatial distribution of the reflection points, it is possible to generate a spatial pattern of the reflection points that is compared with characteristic spatial patterns.

It may also be advantageous if the comparison with characteristic patterns is performed by analyzing the reflected power of the reflection point, the spectral frequency width of the power reflected by the reflection point, the phase of the power reflected by the reflection point, the relative velocity of the reflection points or a combination thereof. By investigating the received signals with regard to the criteria described here, a type of fingerprint of the reflected object may be created and then on the basis of this so-called fingerprint of the object, the object class may be deduced on the basis of these criteria and a comparison with stored characteristic values.

In addition, it may also be advantageous if before the comparison with characteristic patterns, reflection points in close spatial proximity are processed as just one reflection point. Due to this so-called fusion of reflection points in close proximity to one another, it is possible to reduce the computation complexity of the classification algorithm because certain object ranges such as wheel wells of vehicles or large planes on vehicles usually supply multiple reflection points but do not provide any additional information with regard to their relevance regarding the object class, so it is advantageous for these reflection points that are in close proximity to be taken into account by processing just one fused reflection point.

In addition, it is advantageous that the stored characteristic patterns are generated by analyses of previous measurement cycles. This makes it possible to update the characteristic patterns originally saved by refining the characteristic patterns to an ever greater extent by successful object classifications during operation.

It may be particularly advantageous if the stored characteristic patterns include a first table having fixedly predetermined patterns and a second table having deviations, the deviations being difference patterns between the fixedly predetermined patterns and the patterns identified in previous measurement cycles. Before the initial operation of the device and method, fixed values are predefined in the first table having fixedly predetermined patterns, and differences from the predetermined factory-set patterns are generated by successful object classifications having slightly different characteristic patterns, these differences being stored in the second table so as not to overwrite the first factory-predetermined patterns and, in the event of frequent classification errors, the second table may be reset with the difference patterns, so that there may be a new refinement of the characteristic patterns starting from the factory settings. Due to this configuration, it is possible at any time to have access to factory-predetermined characteristic patterns and to be able to further refine them during operation but still be able to return to the factory settings at any time in the event of malfunctions.

The identified objects are advantageously assigned by the analysis to one of the object classes, i.e., passenger vehicle, truck, two-wheeler, guardrail, manhole cover, overpass, overhead sign, beverage can, street sign, or other objects, e.g., in the form of trees on the side of the road or bridge pillars. In addition, it is advantageous to classify the objects in classes, one property of these classes being that the objects are passable (e.g., a manhole cover that may be driven over, a beverage can that may be driven over, an overpass that may be driven under) and/or not passable and one cannot drive over it (e.g., passenger vehicles, trucks, two-wheelers, guardrails, street signs).

This method is advantageously used for adaptive cruise control of a vehicle and/or for triggering emergency braking. In adaptive cruise control, the speed of a vehicle so equipped is regulated at a setpoint speed selected by the driver in the sense of regulating the speed at a constant level when there is no object in front of the host vehicle; and in the case when an identified object is driving in front of the host vehicle, the vehicle's speed is regulated in the sense of regulating a constant distance from the identified object driving in front. To refine the regulating algorithms, it is advantageous here to ascertain the information about the type of object in the case of an identified object so that it is possible to respond differently when driving behind a truck, for example, than when driving behind a passenger vehicle, or so that highly reflective objects such as a manhole cover in the road surface are not taken into account as relevant objects for the cruise control. When the method according to the present invention is used to trigger emergency braking or to prepare for triggering of emergency braking, it is also of critical importance to know the object classes of the identified objects in order to be able to respond better to critical situations that may be indicative of an imminent collision. For example, if a truck executes full braking, it will implement vehicular deceleration at a lower absolute deceleration than is the case in full braking of a passenger vehicle, for example, so that in a case of emergency braking behind a truck, different evasive or braking strategies may be used than in emergency braking behind a passenger vehicle or a two-wheeler traveling in front of the host vehicle.

In addition, it may be advantageous if the analyzer performs a transformation of the received signals into the frequency space and/or into the orthogonal space and perform a spectral analysis of the received signals and/or a spatial analysis of the received signals, respectively. In particular, by providing both transformations and analyses in the orthogonal space and also in the frequency space, it is possible to generate a large number of patterns by which a reliable object classification may be performed by comparison with stored patterns.

Implementation of the example method according to the present invention in the form of a control element that is provided for a control unit of an adaptive cruise control and/or an emergency brake deployment of a motor vehicle may be of particular importance. A program capable of running on a computing unit, in particular on a microprocessor or a signal processor, and suitable for executing the method according to the present invention is then stored on the control element. In this case, the present invention is thus implemented by a program stored on the control element, so that this control element, equipped with the program, represents the present invention in the same way as the method for the execution of which the program is suitable. An electrical memory medium in particular, e.g., a read-only memory, may be used as the control element.

Further features, possible applications, and advantages of the present invention are derived from the following description of exemplary embodiments of the present invention which are depicted in the figures. All described or depicted features per se or in any combination constitute the subject matter of the present invention, regardless of their wording in the description or their illustration in the figures.

BRIEF DESCRIPTION OF THE DRAWINGS

Exemplary embodiments of the present invention are explained in greater detail below with reference to the figures.

DETAILED DESCRIPTION OF EXAMPLE EMBODIMENTS

Figure 1:
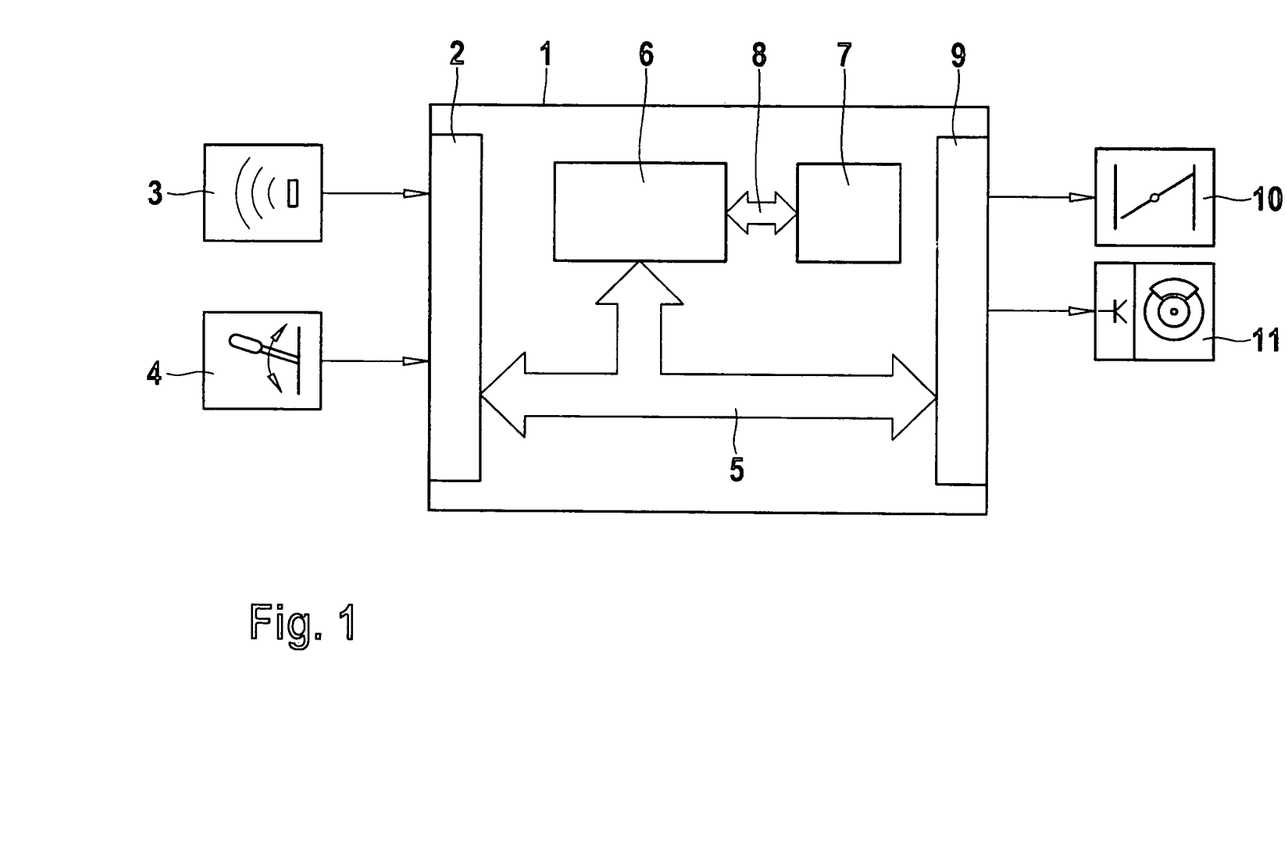
FIG. 1 shows a schematic block diagram of a specific embodiment of a device according to the present invention.

FIG. 1 shows a schematic block diagram of a specific embodiment of the device according to the present invention. This shows a classification device 1 having an input circuit 2. Input signals originating from an object detection sensor 3, for example, and an optional operating element 4 may be supplied to classification device 1 via input circuit 2. Object detection sensor 3 is designed as a sensor that emits electromagnetic radiation into the surroundings in front of the vehicle and, when objects 40, 41, 42, 43, 44 are present in sensor detection area 39, receives wave components that have been reflected on the objects. Object detection sensor 3 may advantageously be designed as a radar sensor or a lidar sensor, this sensor making it possible to ascertain the distance, the azimuth angle of reflecting object 40, 41, 42, 43, 44 with regard to the central axis of the sensor and optionally the relative velocity of the object detected with regard to host vehicle 37. The received signals of object detection device 3 are sent to input circuit 2 of classification device 1. In the case when classification device 1 is additionally designed as an adaptive cruise control or as a control device for triggering emergency braking of a vehicle, it is possible to provide an operating device 4 by which the adaptive cruise control is activatable, deactivatable, or variable in its regulating parameters. The input signals sent to input circuit 2 are sent via a data exchange device 5 to a computation device 6, which may be designed as a microprocessor, for example. In computation device 6, the input signals of object detection sensor 3 are analyzed, the identified objects are classified, and control signals are calculated. In the case when classification device 1 is used for the adaptive cruise control of a vehicle 37, control signals for actuating the drive train and the deceleration mechanisms are set as a function of the received signals of object detection sensor 3 and object classes ascertained therefrom. These control signals are output via data exchange device 5 to an output circuit 9, which in the case when acceleration is desired, triggers a power-determining control element of an internal combustion engine, or when deceleration is required, triggers deceleration devices 11 of vehicle 37. In the case when classification device 1 is able to trigger and perform automatic emergency braking of vehicle 37, control signals are sent by data exchange device 5 from computation device 6 via output circuit 9 to deceleration device 11, which is able to initiate and perform emergency braking of the vehicle. It is advantageous for the calculation of acceleration and/or deceleration requests if computation device 6 knows what type of object is involved. To this end, an object classification is performed according to the method described below, the received signals of object detection sensor 3 being analyzed in computation device 6 and compared with characteristic patterns stored in a memory 7, the type of object being deducible by this comparison. To this end, memory device 7 is connected to computation device 6 via another data exchange device 8. Alternatively, memory 7 may also be connected to computation device 6 via data exchange device 5.

Figure 2:
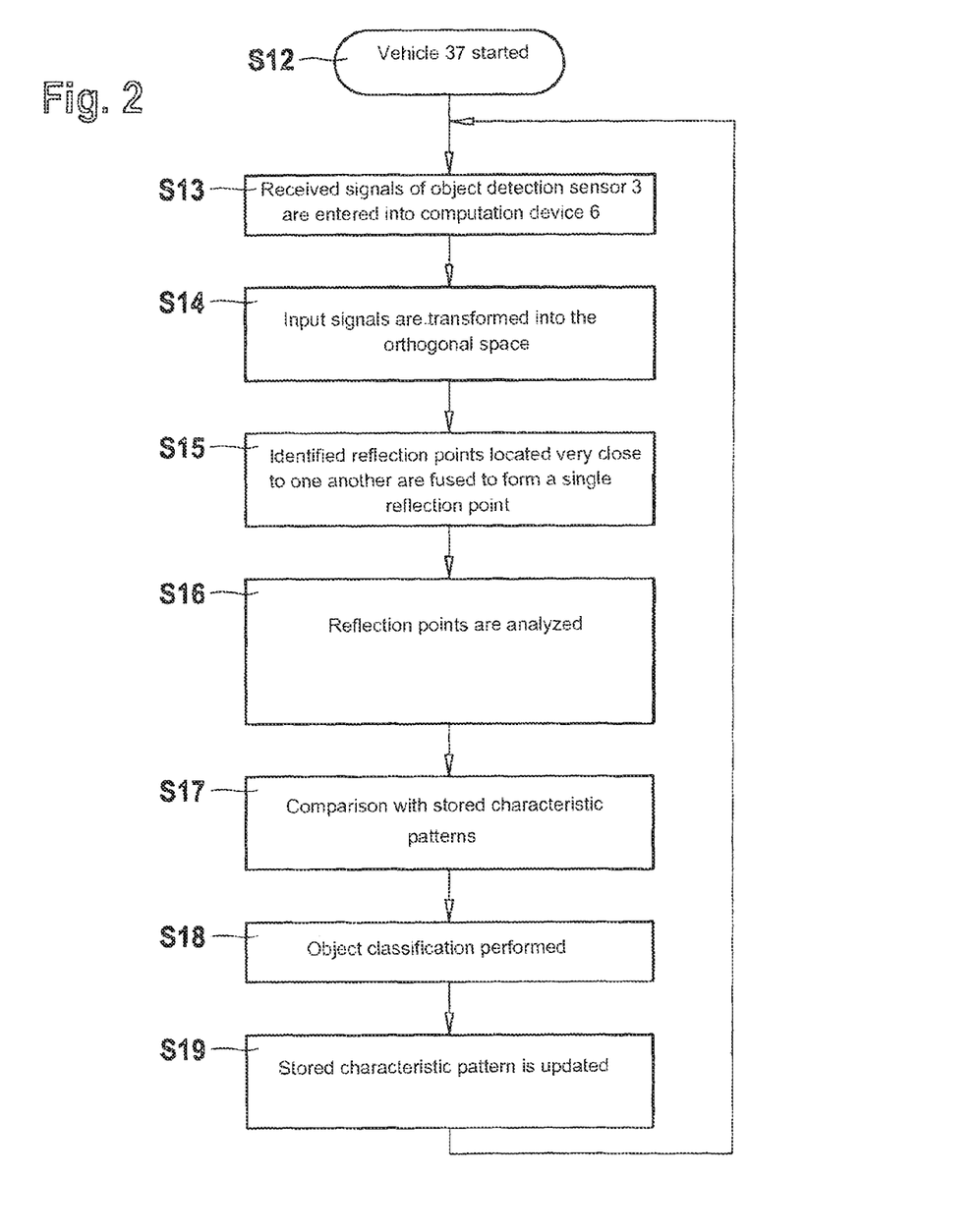
FIG. 2 shows a flow chart of a first specific embodiment of a method according to the present invention.

FIG. 2 illustrates a specific embodiment of the method according to the present invention. The method starts in step S12, which is begun when vehicle 37 is started, for example. In next step S13, received signals of object detection sensor 3 are entered into computation device 6, where the method according to the present invention is running. In next step S14, the input signals, which arrive as time-variable signals, for example, are transformed into the orthogonal space. To this end, the distance and the azimuth angle of the identified reflection points are converted into Cartesian coordinates, the coordinate system optionally being a sensor-fixed coordinate system, for example. In next step S15, identified reflection points located very close to one another are fused to form a single reflection point because there are structures on vehicles, e.g., in the area of the wheel wells, which repeatedly reflect the radar beams emitted or, in the case of a multibeam radar sensor, reflect the radar beams in such a way that they are identified as separate radar reflections. By fusing the reflection points, the required computation power is reduced because fewer points need to be analyzed, but the unique nature of the characteristic pattern is not altered significantly. In next step S16, the reflection points are analyzed with regard to certain criteria. It is thus possible to determine the power of the individual reflection points, for example, to determine the spectral frequency width of the received signals of the individual reflection points by determining both the bandwidth of the reflected signal and the frequency-dependent amplitude of the reflections. In addition, it is possible to determine the phase of the reflected signal and to analyze other characteristic physical values of the received signals. By determining these predetermined criteria and patterns, e.g., of the frequency-dependent power over the frequency spectrum and due to the spatial distribution of the reflection points, which vary depending on the object, a characteristic pattern of the detected object results, so that a comparison with stored characteristic patterns is performed in step S17 which follows. The stored characteristic pattern that corresponds best to the characteristic pattern generated from the object reflection is selected here and the type of object may be deduced on the basis of the selected stored characteristic pattern, as done in step S18. The comparison according to step S17 may be performed mathematically by correlation, for example. After step S18, the class of the object on which the particular reflection point has been reflected is fixed and the object may be assigned to one of the classes, i.e., trucks, passenger vehicles, two-wheelers, manhole covers, guardrails, or other objects. It is then possible to provide an optional step S19 in which the stored characteristic pattern is updated. Thus, for an incremental improvement in the identification of the particular object classes, it is possible for the particular characteristic patterns to be processed, e.g., by using weighting factors with the stored characteristic patterns, when a successful object classification is performed, so that the characteristic stored patterns may be refined incrementally. After processing of step S18 or optional step S19, the method jumps back to step S13, so that in a new measurement cycle input signals of object detection sensor 3 are again input and a loop is formed.

Figure 3:
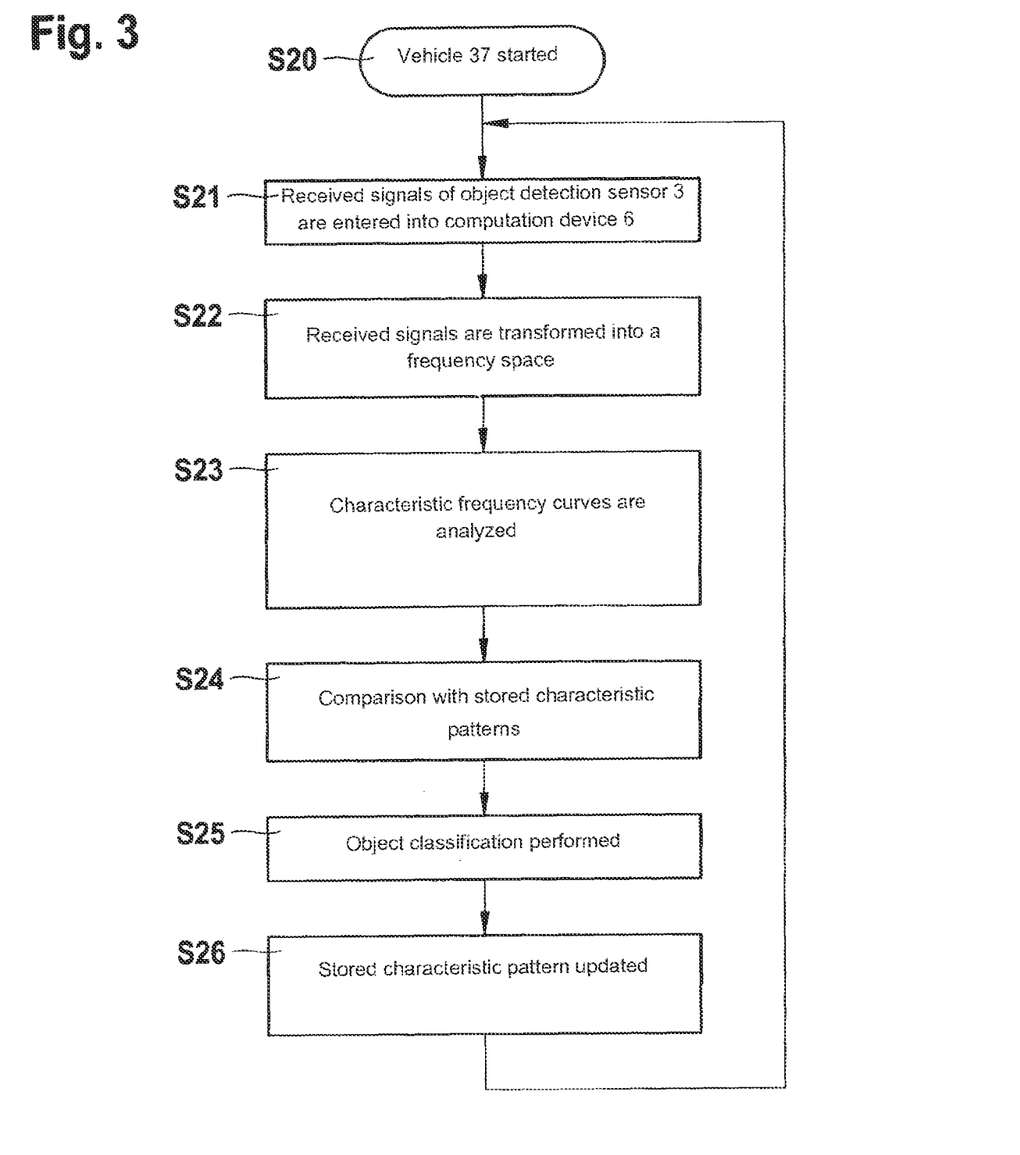
FIG. 3 shows a flow chart of another specific embodiment of the method according to the present invention.

FIG. 3 shows another specific exemplary embodiment of the method according to the present invention. This method in turn also starts at step S20, e.g., when the vehicle is started. In next step S21, the received signals of object detection sensor 3 are again input and sent for analysis. In next step S22, the received signals are transformed into a frequency space, e.g., by a Fourier transform technique, which may be performed as a fast Fourier transform or as a discrete Fourier transform. Characteristic frequency curves which are analyzed in step S23 with regard to predetermined criteria are formed in the frequency space from the received signals of object detection sensor 3. As part of the analysis of step S23, for example, the power of the received signals of each reflection point is determined, the frequency-dependent spectral curve of the frequency patterns, the power density, and the phase are determined and compared in next step S24 with characteristic patterns stored in memory 7. The comparison may be performed mathematically by correlation, for example. The stored characteristic frequency pattern most closely matching the characteristic pattern analyzed from the received signals of object detection sensor 3 is assumed as matching, whereupon in step S25 an object classification may be performed by assigning the detected object to one of the object classes, i.e., truck, passenger vehicle, two-wheeler, guardrail, manhole cover, or other objects, based on the best possible match. This is followed by optional step S26, in which the stored characteristic patterns may be updated when an object classification has been performed successfully in that the characteristic patterns of the detected object are processed with the characteristic patterns stored in memory 7, e.g., by using weighting factors, so that the stored characteristic patterns may be continuously refined further based on successful object classifications in the course of operation. After processing step S25 or optional step S26, the method jumps back to S21, so that received signals of object detection sensor 3 may again be input in a new measurement cycle, forming a loop.

Figure 4:
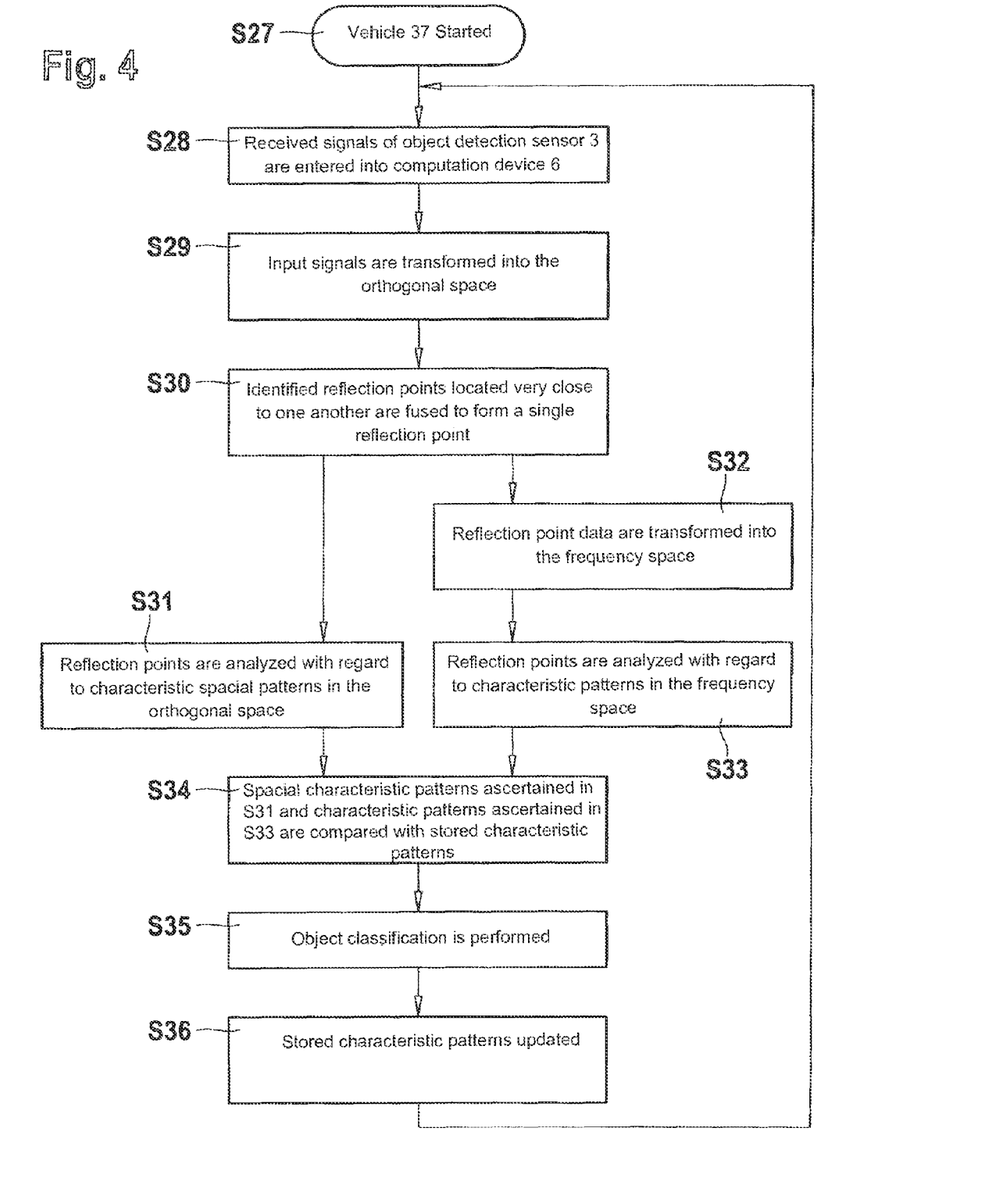
FIG. 4 shows a flow chart of another specific embodiment of the method according to the present invention.

FIG. 4 illustrates another specific embodiment of the method according to the present invention in which the analysis is performed via characteristic patterns in the orthogonal space as well as in the frequency space. This method begins in step S27 by being activated when the vehicle is started, for example. In next step S28, the received signals of object detection sensor 3 are again sent to computation unit 6. In next step S29, the input signals of object detection sensor 3, which are in the form of time-variable signals, are transformed into the orthogonal space, so that the spatial positions of the reflection points are available. In next step S30, the reflection points that are in close proximity to one another are fused, so that the computation effort for analysis may be reduced because multiple reflection points are identified when there are reflection points close together, e.g., as a result of highly reflective structures on vehicles or due to multiple beams of object detection sensor 3. Output data of step S30, in which reflection points close together are fused, are then analyzed with regard to characteristic spatial patterns in the orthogonal space in step S31 and any characteristic patterns that might be present are ascertained. In parallel with step S31, output data of step S30 are sent to step S32, in which the reflection point data are transformed into the frequency space. The reflection point data then available in the frequency range are then analyzed in next step S33 with regard to characteristic patterns in the frequency range and matches with stored characteristic patterns are ascertained. In following step S34, the spatial characteristic patterns in the orthogonal space ascertained in step S31 and the characteristic patterns of the reflection points ascertained in the frequency space in step S33 are compared with characteristic patterns stored in memory unit 7, for example. The method ascertains here via correlation, for example, which stored characteristic pattern has the greatest similarity with the characteristic patterns in the orthogonal space and/or in the frequency space ascertained in step S31 and/or in step S33. On the basis of the choice of stored characteristic patterns having the greatest similarity to the characteristic patterns ascertained, in step S35 the object classification is performed by deducing the corresponding object class on the basis of the stored characteristic pattern, so that the reflection points of an object may be assigned to a passenger vehicle, a truck, a two-wheeler, a guardrail, a manhole cover, or other objects. Step S35 is followed by an optional step S36 in which the stored characteristic patterns may be updated because the stored characteristic patterns may be further refined by successful object classification with an independent characteristic pattern, so that the object classification may be refined progressively with ongoing operation. After optional step S36, the method is continued in step S28 by entering received signals of object detection sensor 3 again in a new measurement cycle.

The update of the stored characteristic patterns according to steps S19, S26, and S36 may optionally be designed in such a way that the characteristic patterns are not stored in a single table but instead two separate tables are provided, where, in a first table, fixedly predefined characteristic patterns have already been stored at the factory and by successful object classifications, which however have minor differences in the characteristic patterns with regard to the predefined factory characteristic patterns, and these differences are stored as a function of the object classes in a second difference table. The fixedly predefined characteristic pattern in the first table may be further refined by the updates by ascertaining additional data in a difference table on the basis of the object classifications already performed successfully. This makes it possible to delete the difference table automatically, for example, in the event of an accumulation of faulty classifications and to continue processing using predetermined characteristic patterns predefined at the factory to prevent degradation of the object classification method.

Figure 5:
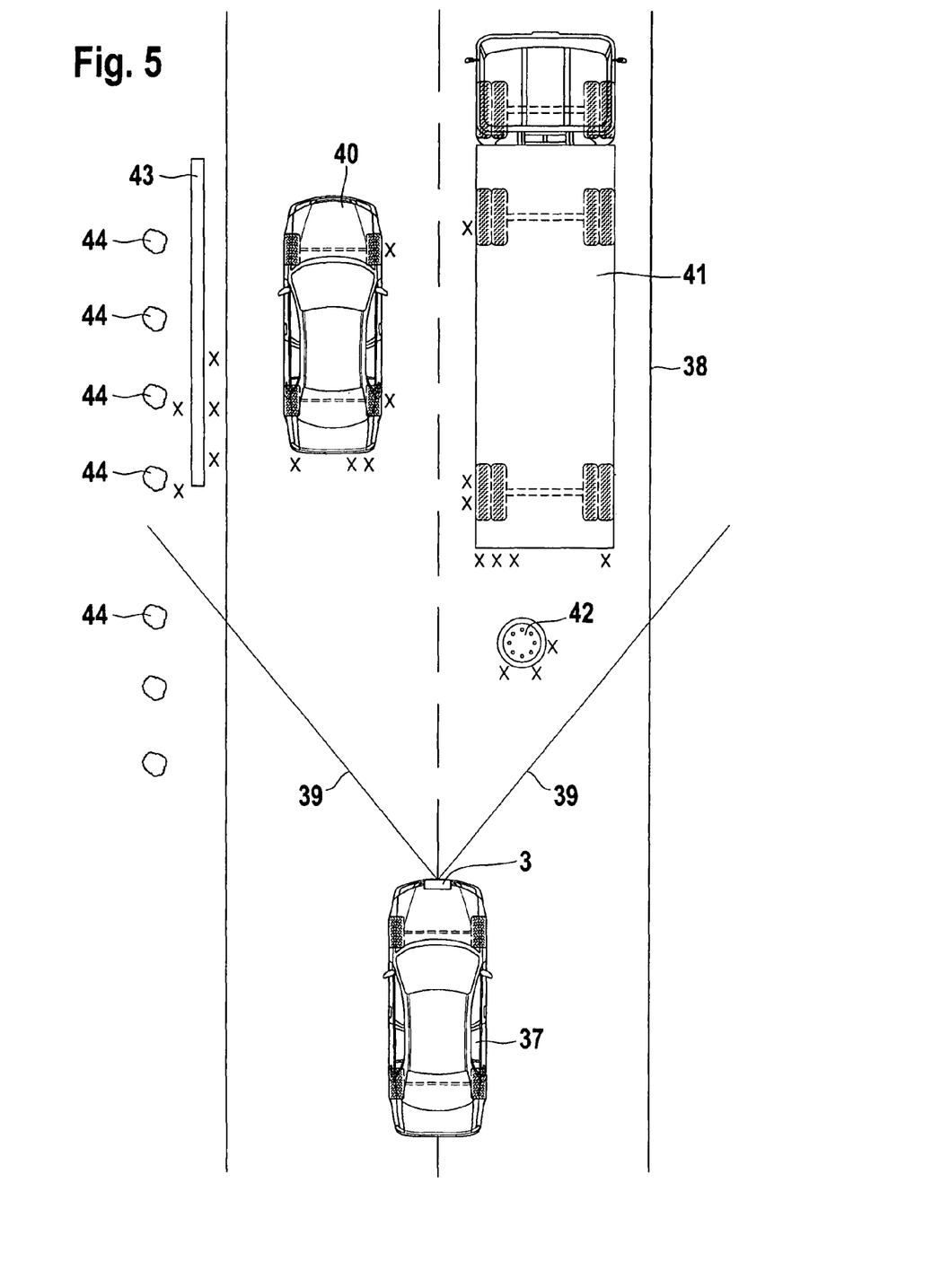
FIG. 5 shows a first traffic situation, in which the individual reflection points of the reflected electromagnetic radiation are illustrated.
Figure 6:
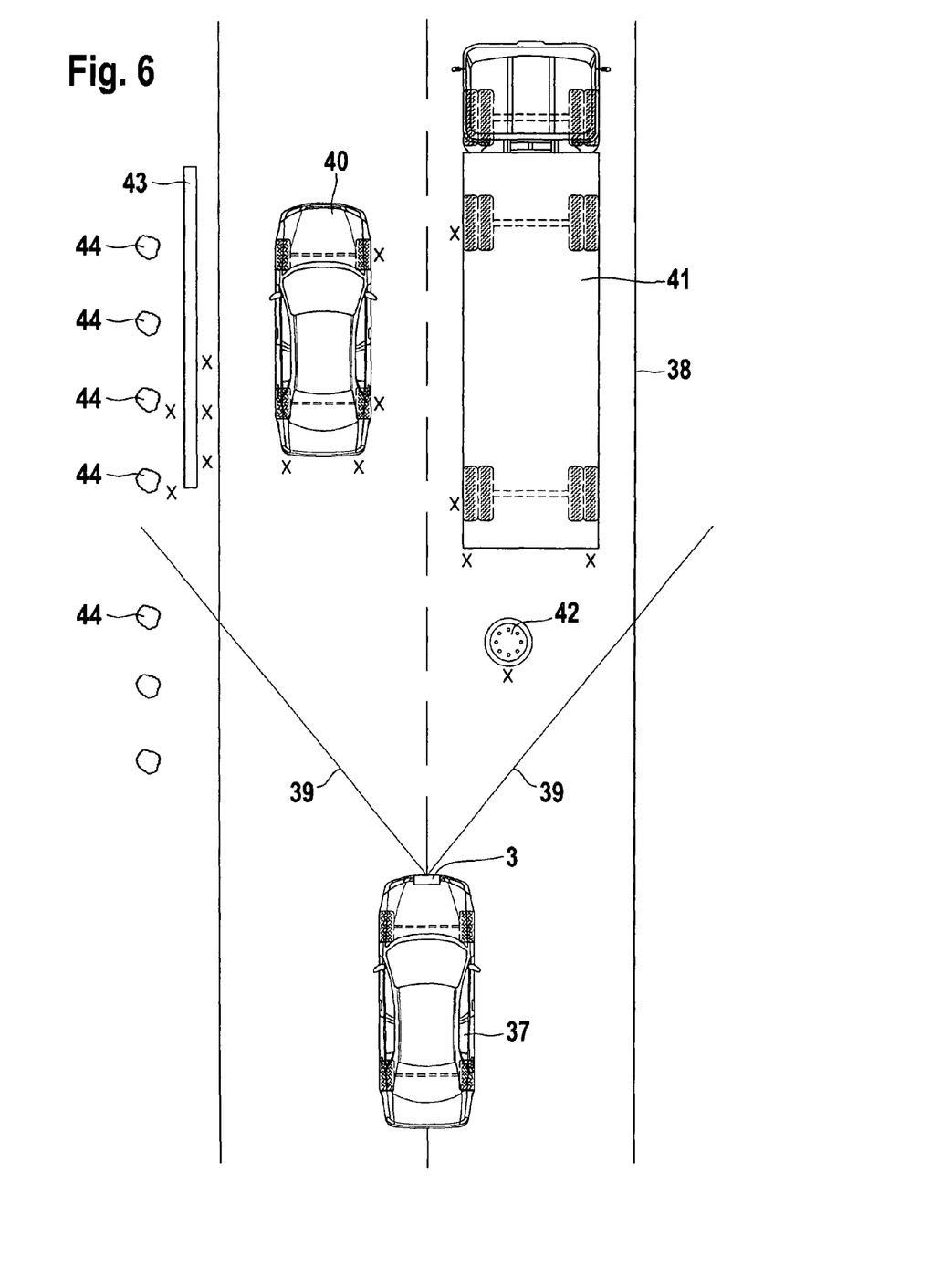
FIG. 6 shows another traffic situation, in which the reflection points have been partially fused.
Figure 7:
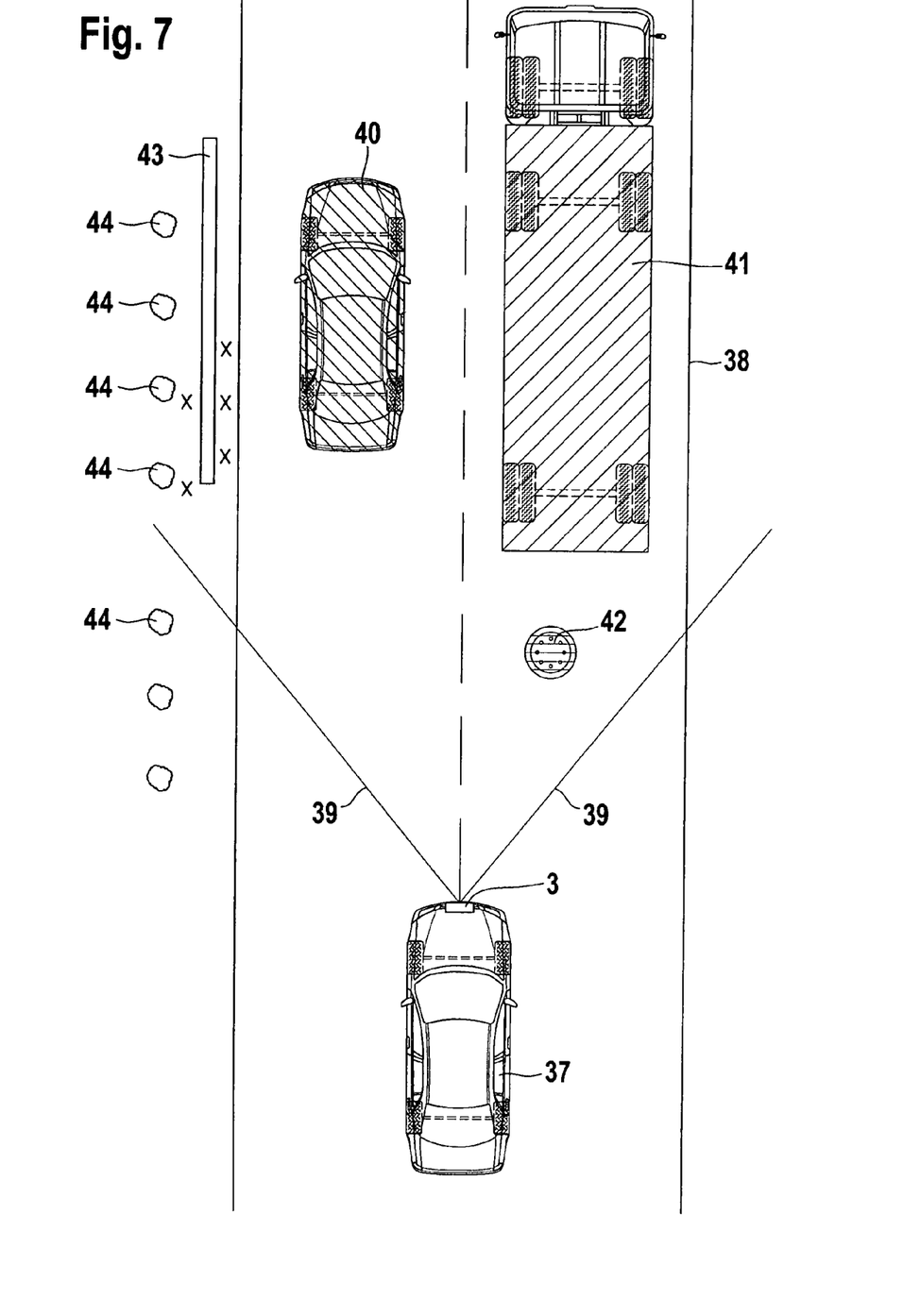
FIG. 7 shows another traffic situation, in which the identified objects have been classified.

FIG. 5 illustrates a typical traffic situation that is processed with the method according to an example embodiment of the present invention. This shows a host vehicle 37, which is moving on a multilane road 38. This host vehicle 37 is equipped with an object detection sensor 3 that detects the vehicle surroundings in front of the vehicle and identifies objects within the limits of detection range 39. Object detection sensor 3 therefore emits electromagnetic radiation that is partially reflected on objects within detection range 39 and is reflected back to object detection sensor 3, which receives it and analyzes it. In front of the host vehicle 37, a passenger vehicle 40 is traveling in the left lane and a truck 41 is traveling in the right lane. Furthermore, a manhole cover 42 is shown on the road surface, representing a good reflector for electromagnetic radiation because of its metallic surface. In addition, a guardrail 43 is shown on the left side of the road and other objects 44 are also shown in this drawing as regularly spaced objects, e.g., in the form of trees along the side of the road. The electromagnetic radiation emitted by object detection sensor 3, in particular in the form of microwave radiation, is reflected here by the objects described, and it is possible for radiation emitted by object detection sensor 3 to be reflected on an object multiple times. In FIG. 5, the points at which the electromagnetic power emitted by object detection sensor 3 is reflected on objects 40, 41, 42, 43, 44 are marked by small x's. Thus, for example, passenger vehicle 40 has one reflection point on the left rear corner, two reflection points on the right rear corner and one reflection point each on the right front and right rear wheels. Truck 41 traveling in the neighboring lane has one reflection point on the right rear corner, a total of three reflection points on the left rear corner, two reflection points on the left rear wheel of the semi-trailer, and also one reflection point on the left rear wheel of the tractor. Manhole cover 42 also has three reflection points, which are in turn marked with small x's. Guardrail 43 has three reflection points located along the right side of guardrail 43. Other objects 44, representing trees along the side of the road, for example, in this diagram, also have some reflection points if they are within detection range 39, and these are also marked with small x's. The input signals received by object detection sensor 3 are then relayed via input circuit 2 and data exchange device 5 to computation device 6 where they are converted into spatial relative positions with respect to a sensor-fixed coordinate system and therefore may be analyzed in the orthogonal space. For the analysis, in an optional first step reflection points that are close together are fused. To do so, the positions thereby ascertained for the reflection points indicated by x's in FIG. 5 are analyzed for whether they are in close proximity to one another. Reflection points in close proximity are fused to a single reflection point to reduce computation power. For the sake of illustration of the reflection points remaining thereafter, FIG. 6 illustrates the same traffic situation, but the x's for the reflection points have not been entered here and instead the reflection points after fusion of reflection points that are in close proximity to one another are again represented by x's. Thus, passenger vehicle 40 in FIG. 6 has only one single reflection point now according to FIG. 6 on the right rear corner that had two reflection points in FIG. 5, because the two reflection points shown in FIG. 5 have been fused into a single reflection point. Likewise, the three right reflection points that are in close proximity to one another on the left rear corner have been fused into a single reflection point with regard to truck 41 and the two reflection points on the left rear wheel of the semi-trailer have also been fused into a single reflection point. With regard to manhole cover 42, the three individual reflection points which are situated very close together are fused into a single reflection point, represented by a single x in FIG. 6. The three reflection points indicated by x's on the right border of guardrail 43 in FIG. 5, however, are retained as three individual reflection points because their distance was sufficiently great that they were not fused into a single point. Other objects 44 on the left side of the road, which also have reflection points according to FIG. 5, are likewise preserved as separate reflection points because they could not be fused together due to their spatial spacing. In this way, according to FIG. 6, the number of reflection points to be analyzed is reduced in comparison with the reflection points shown in FIG. 5 so this achieves a reduction in computation power. These reflection points are then analyzed in the orthogonal space and/or in the frequency space, whereby for the analysis in the frequency space, the reflection points of FIG. 6 must be converted into the frequency space by using a Fourier transform technique, for example. The fusion of reflection points that are in close proximity as well as the transformation into the frequency range that may be required were performed here in computation means 6 of FIG. 1. The reflection point data in the orthogonal range or frequency range are then analyzed with regard to characteristic patterns, for example, by analyzing the reflected power of each reflection point. For example, the large rear surface of a truck 41 having a box-type design reflects much more power than would the rear section of a passenger vehicle 40 or the rough surface of manhole cover 42. Furthermore, a truck 41 will have major fissures in the area of the chassis, so the probability of multiple radar reflections is greater with a truck 41 than with a passenger vehicle 40, which essentially has a closed outer body shape. Due to the analysis of the spectral frequency width of the reflection points, for example, it is also possible to define characteristic frequency responses which also allow a deduction as to the object class of the detected object. It should be pointed out here that as many different physical properties of the reflection points as possible should be analyzed because analysis of the individual criteria yields a type of fingerprint of the reflection point, and thus an assignment of the reflection point to an object of a predetermined object class may be performed with the highest possible probability. For example, it is also possible to assign reflection points having the same relative velocity, situated a distance apart within a certain range, to a single object and thus also to deduce the size of the object, so that a truck 41, for example, may be differentiated from a passenger vehicle 40, a two-wheeler or a manhole cover 42. Due to the analysis of the relative velocity it is also possible to detect guardrails or other objects on the side of the road as stationary objects because they have approximately the same relative velocity in relation to the sensor as the velocity at which the vehicle is traveling. By ascertaining characteristic patterns of the reflection points, for example, on the basis of the relative velocity, the power of the power reflected by the reflection point, the spectral width of the reflected radiation of the reflection point and the phase of the reflected power of the reflection point, a comparison of these patterns is possible based on the characteristic patterns stored in a memory 7, this comparison optionally being performed by computer based on a correlation, for example. In the course of the object classification, the pattern stored in memory 7 as a characteristic predetermined pattern is recognized as the pattern most similar to the pattern ascertained from the reflection points having the greatest positive correlation. It is possible in this way to deduce the type of object, because one or more characteristic patterns have been stored in memory 7 for each object class. Thus, FIG. 4 shows the reflection points of passenger vehicle 40 as belonging to one object, and these reflection signals are assigned to an object of the passenger vehicle class on the basis of the reflected power of the reflection points, their spectral frequency patterns, and the phase of the received signals. With the object classification, it is possible to deduce the spatial extent of the vehicle according to FIG. 7, which is represented here by a dashed line for object 40. Likewise, the reflection points of truck 41 may also be analyzed as belonging to one object and an object of the truck class may be deduced on the basis of their characteristic patterns. The spatial size and orientation of truck 41 may also be deduced based on the spatial distribution of these reflection points, which is indicated by shading in FIG. 7. An object of the manhole cover class may be deduced from the reflections of manhole cover 42 and their characteristic patterns, so that manhole cover 42 is recognized as an irrelevant object with regard to an adaptive cruise control or with regard to emergency braking and it may be driven over safely by vehicle 37, for example. The stationary objects on the side of the road, e.g., guardrail 43, have been classified as a guardrail on the basis of the spatial arrangement of the reflection points, the spectral characteristics of the reflection points, and the relative velocity of these objects, so that it may be used for a plausibility check of the future driving corridor, for example, because the guardrail has been identified as an object situated directly on the side of the road of multilane road 38.

Figure 8:
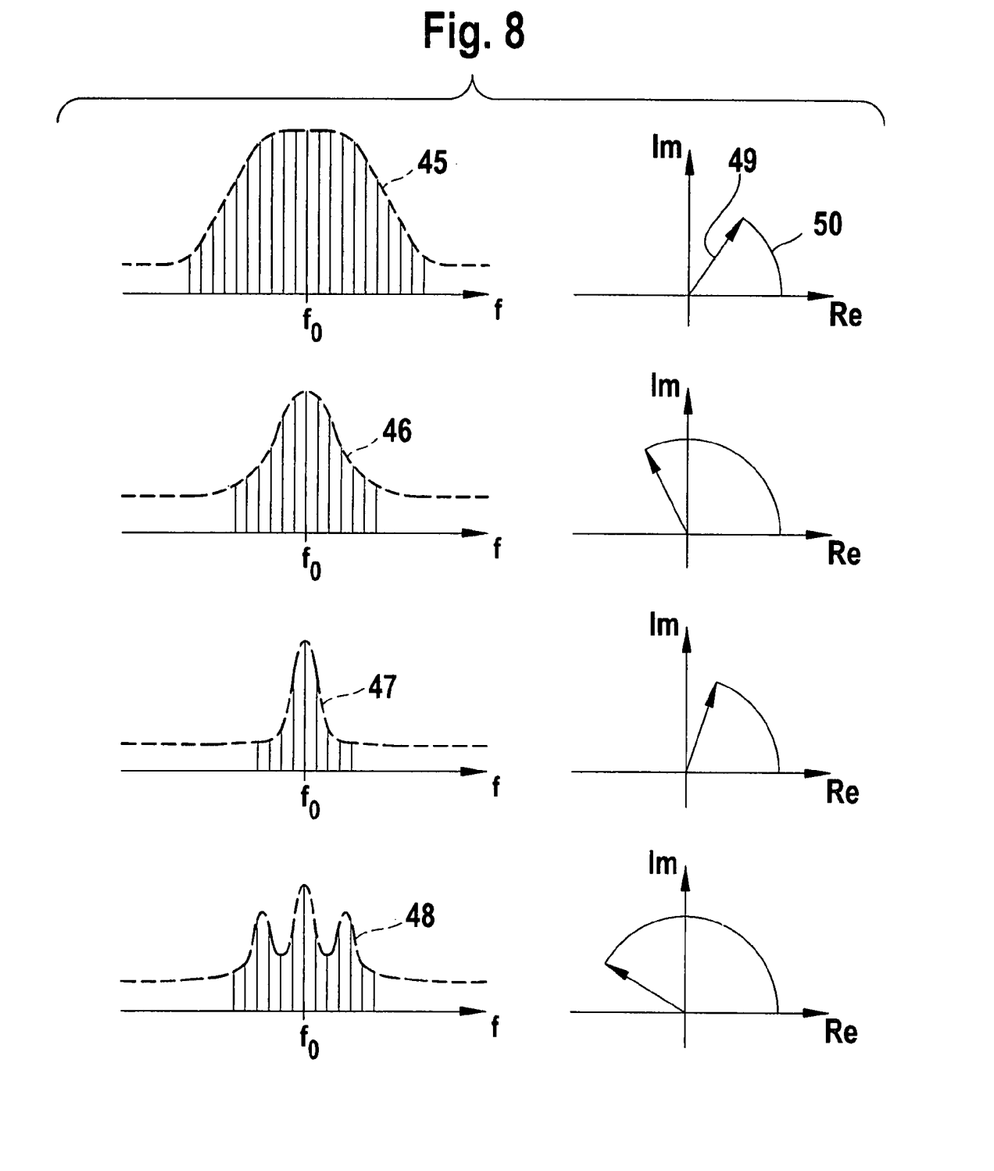
FIG. 8 shows an overview of some representative, predetermined characteristic patterns that are used for comparison with patterns generated from the received signals.

FIG. 8 shows an overview of several characteristic frequency curves of object reflections. The graph at the top shows a characteristic pattern of a truck in which a spectrum of an object reflection of a truck has been plotted on a frequency axis f. This shows enveloping curve 45, which is approximately symmetrical with a mid-frequency $f_0$. Enveloping curve 45 here has a relatively high amplitude of the individual spectral components because the rear end of a truck is usually highly reflective. In addition, the enveloping curve of the truck has a great width over frequency f, which is also an important criterion for the characteristic pattern. At the right next to the spectral pattern there is a phase diagram of the truck reflection point, which has the real part on the abscissa and the imaginary part on the ordinate. A phase vector 49 that has a certain phase 50 for reflection on the truck is also shown for the purpose of illustration. Below the diagram for the truck, a characteristic diagram for passenger vehicles has been plotted, having an enveloping curve 46 which in turn has a lower frequency width than enveloping curve 45 for the truck and a lower amplitude than the enveloping curve for the truck. With regard to the phase information for the characteristic pattern of the passenger vehicle, it should be pointed out that this usually has a larger phase for objects of the passenger vehicle class than for trucks. The characteristic pattern for a manhole cover here is represented by enveloping curve 47, which has a very small frequency width but nevertheless has a relatively high amplitude, which explains the good reflection properties of a manhole cover. Below that the characteristic pattern of a guardrail is shown, which usually has multiple reflection points. Enveloping curve 48 thus also has several peaks and a very large phase according to the phase diagram beside it. For each of the object classes provided, such a characteristic frequency pattern, such a characteristic phase pattern, and additional characteristic values are stored and used for comparison with the characteristic patterns obtained from the received signals of object detection sensor 3.

What is claimed is:

1. A method for identifying and classifying objects, comprising:
    emitting by a sensor electromagnetic radiation;
    receiving by the sensor radiation signals reflected by an object;
    analyzing the received signals by comparison with stored characteristic patterns, wherein the stored characteristic patterns include a first table having fixedly predetermined patterns and a second table having deviations, the deviations being difference patterns between the fixedly predetermined patterns and patterns identified in previous measurement cycles; and
    deducing a class of the reflecting object based on the analysis.

2. The method as recited in claim 1, wherein the analysis of the received signals is performed in a frequency range by transforming the received signals by a Fourier transform and comparing them with characteristic frequency patterns.

3. The method as recited in claim 1, wherein the analysis is performed in an orthogonal space by determining relative positions of the object reflections in relation to a host vehicle and comparing them with characteristic spatial patterns.

4. The method as recited in claim 1, wherein the comparison with the characteristic patterns is performed by analyzing at least one of reflected power of a reflection point, a spectral frequency width of a power reflected by the reflection point, a phase of radiation reflected by the reflection point, and a relative velocity of the reflection points.

5. The method as recited in claim 1, wherein before the comparison with the characteristic patterns, reflection points in close spatial proximity to one another are processed as just one reflection point.

6. The method as recited in claim 1, wherein the stored characteristic patterns are generated by analyses of previous measurement cycles.

7. The method as recited in claim 1, wherein the stored characteristic patterns are updated after each renewed classification of an object.

8. The method as recited in claim 1, wherein identified objects are assigned by the analysis to one of the classes: objects that can be driven over, or objects that cannot be driven over.

9. The method as recited in claim 1, wherein identified objects are assigned by the analysis to one of the object classes: passenger vehicle, truck, two-wheeler, guardrail, manhole cover, overpass, overhead sign, beverage can, signs, or other objects.

10. The method as recited in claim 1, wherein the method is used for at least of adaptive cruise control and triggering emergency braking.

11. The method as recited in claim 1, wherein the analysis of the received signals is performed in a frequency range by transforming the received signals by a Fourier transform and comparing them with characteristic frequency patterns, and wherein the comparison with the characteristic patterns is performed by analyzing at least one of reflected power of a reflection point, a spectral frequency width of a power reflected by the reflection point, a phase of radiation reflected by the reflection point, and a relative velocity of the reflection points.

12. The method as recited in claim 11, wherein the comparison with the characteristic patterns is performed by analyzing at least one of reflected power of a reflection point, a spectral frequency width of a power reflected by the reflection point, a phase of radiation reflected by the reflection point, and a relative velocity of the reflection points.

13. The method as recited in claim 11, wherein before the comparison with the characteristic patterns, reflection points in close spatial proximity to one another are processed as just one reflection point.

14. The method as recited in claim 1, wherein the analysis is performed in an orthogonal space by determining relative positions of the object reflections in relation to a host vehicle and comparing them with characteristic spatial patterns, and wherein the comparison with the characteristic patterns is performed by analyzing at least one of reflected power of a reflection point, a spectral frequency width of a power reflected by the reflection point, a phase of radiation reflected by the reflection point, and a relative velocity of the reflection points.

15. The method as recited in claim 14, wherein the comparison with the characteristic patterns is performed by analyzing at least one of reflected power of a reflection point, a spectral frequency width of a power reflected by the reflection point, a phase of radiation reflected by the reflection point, and a relative velocity of the reflection points.

16. The method as recited in claim 14, wherein before the comparison with the characteristic patterns, reflection points in close spatial proximity to one another are processed as just one reflection point.

17. The method as recited in claim 1, wherein the stored characteristic patterns are generated by analyses of previous measurement cycles, and wherein identified objects are assigned by the analysis to one of the classes: objects that can be driven over, or objects that cannot be driven over.

18. The method as recited in claim 1, wherein the stored characteristic patterns are updated after each renewed classification of an object, and wherein identified objects are assigned by the analysis to one of the classes: objects that can be driven over, or objects that cannot be driven over.

19. The method as recited in claim 1, wherein identified objects are assigned by the analysis to one of the object classes: passenger vehicle, truck, two-wheeler, guardrail, manhole cover, overpass, overhead sign, beverage can, signs, or other objects, and wherein the method is used for at least of adaptive cruise control and triggering emergency braking.

20. A device for identifying and classifying objects, comprising:
 a sensor adapted to emit electromagnetic radiation, the sensor further adapted to receive radiation signals reflected on an object;
 an analyzer adapted to analyze the received signals;
 a memory adapted to store characteristic patterns, wherein:
  the stored characteristic patterns include a first table having fixedly predetermined patterns and a second table having deviations, the deviations being difference patterns between the fixedly predetermined patterns and patterns identified in previous measurement cycles, and
  the analyzer is adapted to compare the stored characteristic patterns with the received signals, and to deduce a class of the reflecting object based on the comparison.

21. The device as recited in claim 20, wherein the analyzer is adapted to perform a transformation of the received signals into a frequency space and perform a spectral analysis of the received signals.

22. The device as recited in claim 20, wherein the analyzer is adapted to perform a transformation of the received signals into an orthogonal space and perform a spatial analysis of the received signals.

* * * * *

UNITED STATES PATENT AND TRADEMARK OFFICE
CERTIFICATE OF CORRECTION

PATENT NO.        : 8,542,106 B2                                          Page 1 of 1
APPLICATION NO.   : 11/919622
DATED             : September 24, 2013
INVENTOR(S)       : Hilsebecher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1655 days.

Signed and Sealed this
Fifteenth Day of September, 2015

Michelle K. Lee
*Director of the United States Patent and Trademark Office*